(12) United States Patent
Mudulodu et al.

(10) Patent No.: US 10,757,652 B2
(45) Date of Patent: Aug. 25, 2020

(54) WIRELESS RECEIVER WITH FIELD CAPTURE FOR BEACON FRAMES

(71) Applicant: Silicon Laboratories Inc., Austin, TX (US)

(72) Inventors: Sriram Mudulodu, Hyderabad (IN); Partha Sarathy Murali, Sunnyvale, CA (US); SuryaNarayana Varma Nallaparaju, Vizianagaram (IN); Logeshwaran Vijayan, Hyderabad (IN); Subba Reddy Kallam, Sunnyvale, CA (US); Venkat Mattela, San Jose, CA (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 16/221,325

(22) Filed: Dec. 14, 2018

(65) Prior Publication Data
US 2019/0191373 A1 Jun. 20, 2019

Related U.S. Application Data

(60) Provisional application No. 62/599,596, filed on Dec. 15, 2017.

(51) Int. Cl.
*H04W 52/02* (2009.01)
*H04B 1/16* (2006.01)
*H04W 40/24* (2009.01)
*H04W 84/12* (2009.01)

(52) U.S. Cl.
CPC .......... *H04W 52/0229* (2013.01); *H04B 1/16* (2013.01); *H04W 40/244* (2013.01); *H04W 84/12* (2013.01)

(58) Field of Classification Search
CPC .. H04B 1/16; H04W 40/244; H04W 52/0229; H04W 84/12
See application file for complete search history.

(56) References Cited

U.S. PATENT DOCUMENTS

| 9,742,412 | B1* | 8/2017 | Murali | ............. H04W 52/0229 |
| 2013/0034004 | A1 | 2/2013 | Mannemala et al. | |
| 2014/0204822 | A1* | 7/2014 | Park | .................. H04W 68/025 370/311 |
| 2015/0078229 | A1 | 3/2015 | Choi et al. | |
| 2016/0113034 | A1 | 4/2016 | Seok | |
| 2019/0059055 | A1* | 2/2019 | Murali | .................. H04L 1/0039 |

FOREIGN PATENT DOCUMENTS

WO 2013130998 A1 9/2013

OTHER PUBLICATIONS

Search Report for PCT/US2018/065881.

\* cited by examiner

*Primary Examiner* — Kashif Siddiqui
(74) *Attorney, Agent, or Firm* — File-EE-Patents.com; Jay A. Chesavage

(57) ABSTRACT

A wireless receiver powers up shortly before the expected arrival of a beacon frame, and upon detection of a beacon frame from an access point the station is associated with and determination of subsequent fields of interest, including at least a TIM field, the receiver powers down. At the previously identified fields of interest, the receiver powers up and uses previously stored values to continue packet demodulation, thereafter examining the TIM field to determine whether the AP has packets to transmit to the station.

15 Claims, 12 Drawing Sheets

Access Point, Stations, Infrastructure Mode

Congestion-free AP beacons, STA wake-up, and transmit window

Figure 3

AP beacons with interferers, STA wake-up, and transmit window

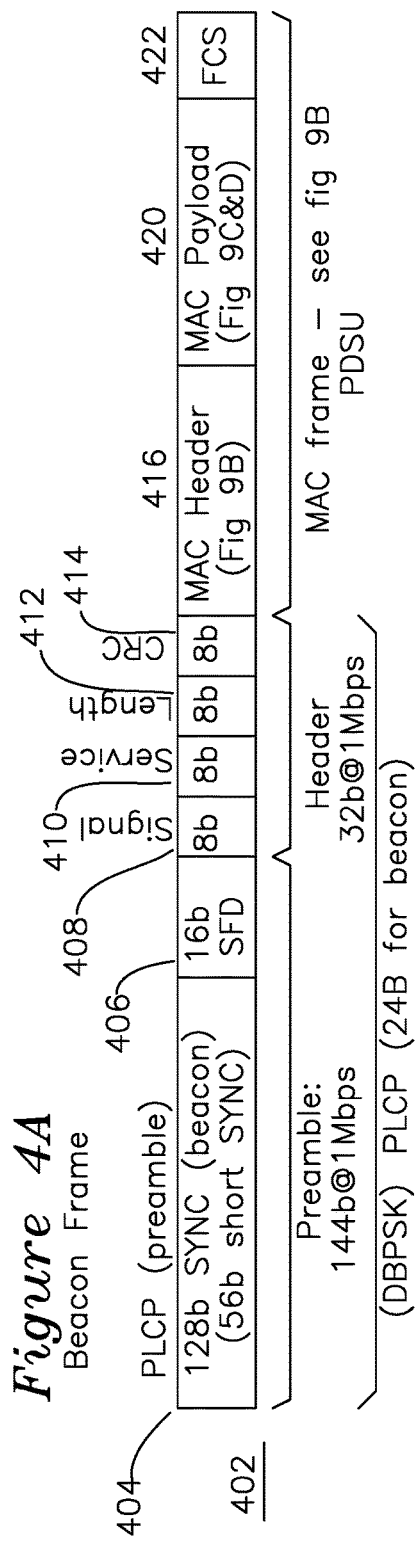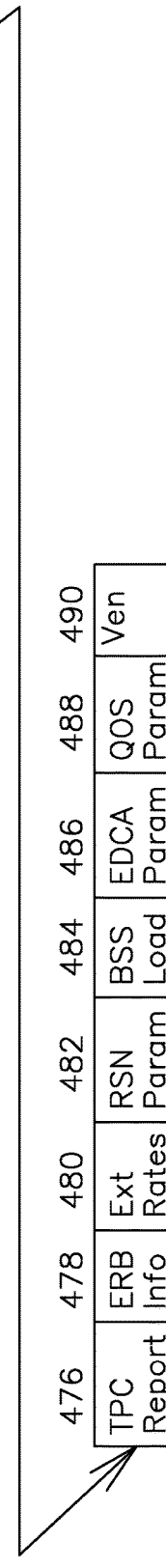

Receiver Preamble Detection sequence

Earliest possible detection

Latest possible detection

Beacon Preamble Detection Sampling Process

Full Processing of Beacon Frame

Processing of Unchanged Beacon Frame

Minimal Processing of Unchanged Beacon Frame

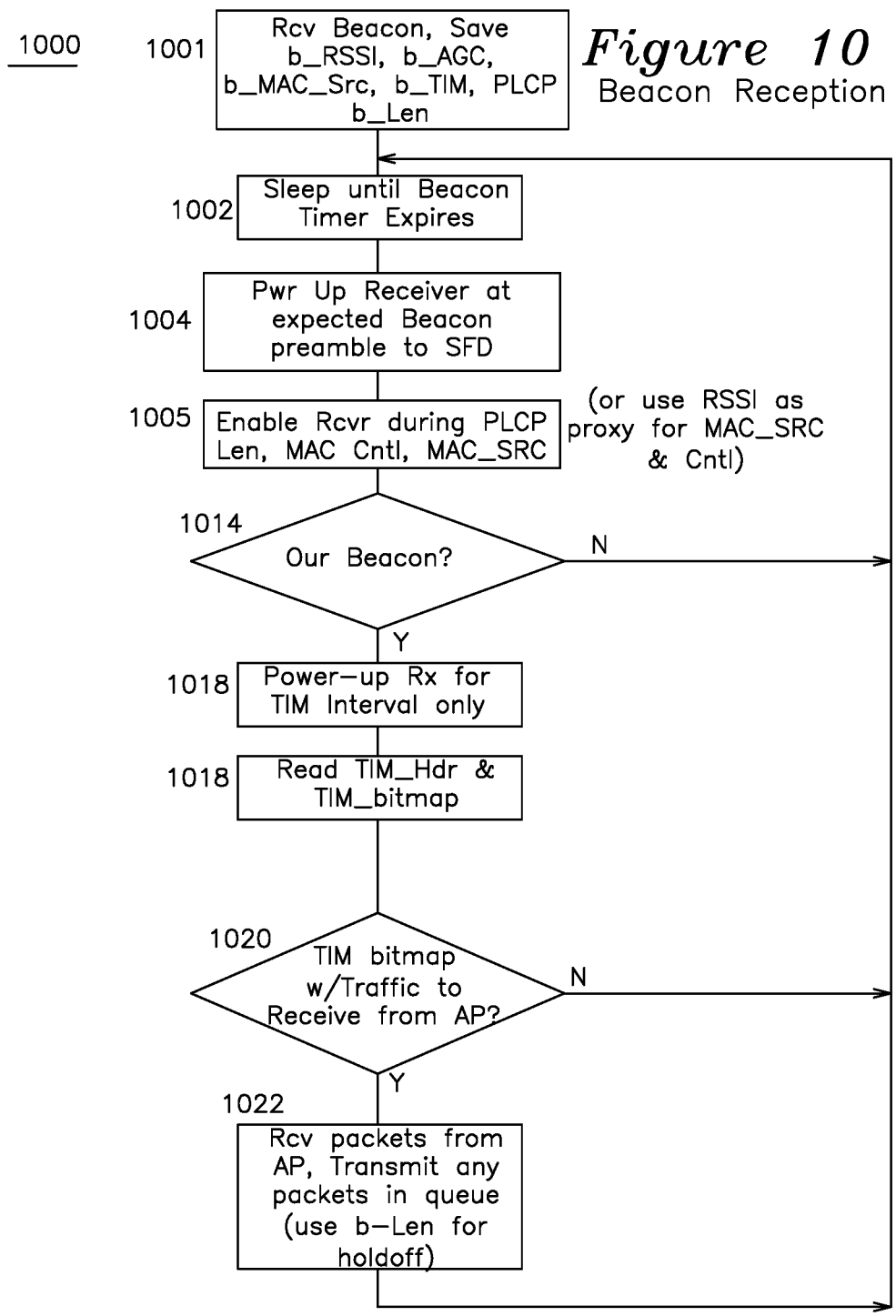

Combined Beacon Preamble Sampling and Field Selective Poweron

Cross-Correlating Preamble Processor

Cross-Correlating Preamble Processor

WIRELESS RECEIVER WITH FIELD CAPTURE FOR BEACON FRAMES

FIELD OF THE INVENTION

The present invention relates to an apparatus and method for low power wireless receiver operation in a receiver which is in a power-down mode but which periodically wakes up to respond to particular fields of periodic beacon frames, particularly fields which define available receive or transmit intervals.

BACKGROUND OF THE INVENTION

Under the wireless local area network (WLAN) IEEE Standard 802.11, wireless stations (STA) and access points (AP) may operate in an infrastructure mode. Infrastructure mode defines a set of communication protocols, one of which is an association protocol for a station to join an access point, another of which provides for an access point which operates continuously to periodically communicate with a station which has the characteristic of being in a power-down (sleep) mode, where the station periodically is activated into a power-up (wake-up) state to receive a Delivery Traffic Indication Map (DTIM) which indicates whether there are packets to be transmitted to the newly-awakened station from the AP. This power-saving protocol conserves a significant amount of station power by only consuming power when in the power-up state (the interval when power is applied to the receiver circuits) shortly prior to the expected arrival of a beacon frame, throughout the beacon frame, and where the power-up state occurs during defined intervals related to periodic beacon intervals. A typical beacon interval is 100 ms. In one example prior art embodiment, the wireless AP transmits a frame known as Delivery Traffic Indication Map (DTIM) and the STA responds indicating how often the station will wakeup to check the beacon frame to receive or transmit to the AP. According to the 802.11 power-saver protocol for stations, the station is in a power-up state shortly prior to the expected arrival of the AP beacon frame, and the STA remains powered on throughout the beacon interval to determine whether the traffic indication map (TIM) of the beacon frame indicates there are receive packets destined to the AP, and if so, the station STA remains in a power-up state until the packets are received. A prior art station also remains powered up until the arrival of a beacon frame. The TIM includes a header part indicating station assignments and a bitmap part indicating whether a particular station has traffic to receive.

A problem arises in congested networks, where the STA may wake up at the appointed beacon interval, but the beacon frame is delayed in transmission by the transmitting AP because of network congestion (such as from an associated station transmitting, or a station or other access point on the same WLAN channel is nearby and interfering), in which case the AP waits for a clear channel before transmitting the beacon frame. During either of these disruptions, the STA remains powered up and awaiting reception of the delayed beacon frame, causing unwanted power consumption. Additionally, each beacon frame must be received and the TIM examined to determine whether the AP has a packet to transmit to the station, including during long intervals where there are no packets to be received from the AP. It is desired to provide a power saving apparatus and method which provides improved power savings in a station operative in congested networks where the station wakes up and the expected beacon is delayed because of network congestion or interferers, and to provide an apparatus and method for reducing receiver power consumption during beacon frame reception.

OBJECTS OF THE INVENTION

A first object of the invention is a beacon frame receiver for a station which, upon determining the received frame is a beacon frame from a remote access point the stations is associated with, the receiver powers down through the rest of the beacon frame and powers up during at least the TIM field of the beacon frame, and optionally also powers on during any of the other preceding fields of the beacon frame: a control field, a MAC source address, a frame length, a start of frame delimiter (SFD), or to estimate symbol timing or RSSI during the preamble or other field, and also enabling the receiver during the TIM field, thereby receiving the TIM field, specifically the TIM bitmap indicating the presence of traffic for the station to receive, and optionally also the TIM header indicating any changes in the TIM bitmap assignments since the last beacon frame, the receiver being powered down during other fields.

A second object of the invention is a wireless packet receiver which detects a beacon frame preamble, estimates the location of a TIM field, powers down until the field is read, and powers up only for the interval of the TIM field, and, optionally, other fields of the beacon frame.

A third object of the invention is a receiver and a preamble processor which receives part of a SYNC field of a preamble, estimates the location of at least a TIM field interval of a beacon packet from the partially received sync field such as by cross correlation with a matching polynomial generating the SYNC field of the preamble, the receiver being in a power down state for other fields of the beacon frame, except for the TIM interval during which it is powered up, the receiver optionally also powered up during one or more of a MAC address field interval, a packet length field interval, a control field interval, a length field interval, or a start of frame delimiter field interval.

A fourth object of the invention is an apparatus and method for reduced power consumption in periodic power-up of a wireless station at a beacon wakeup time for detection of a preamble of a beacon frame, whereby:

upon the expected arrival of a beacon frame, the station entering into a repetitive series of preamble detect cycles, each preamble detect cycle comprising a preamble detection interval followed by a sleep interval;

where power is applied to a phase lock loop (PLL) a PLL settling time prior to each preamble detection interval and also throughout the preamble detection interval;

each preamble detection interval having a duration substantially equal to a preamble sensing time sufficient to detect a preamble and assert a preamble detect signal;

each sleep interval having a duration equal to a preamble duration minus the sum of two times the preamble detection interval plus a preamble processing interval;

where power is applied to a preamble detector during the preamble sensing interval and when a preamble is present, power remains applied to the preamble detector and also a preamble processor;

where power is removed from the PLL, preamble detector, and preamble processor during the sleep interval, and upon detection of a preamble, the station being enabled during a TIM field and optionally other fields, and in a sleep mode at other times.

A fifth object of the invention is a process for power-up of a wireless receiver receiving beacon frames operative on a receiver having RF functions, PLL functions, a preamble detector, and a preamble processor, the PLL function having a settling time, the preamble detector having a preamble sensing interval, and the preamble processor having a preamble processing interval, the process comprising:

identifying an expected preamble arrival time;

repetitively cycling power on during a preamble detection interval and off during a sleep interval, where during the preamble detection interval power is applied to the RF components and preamble detector, and where during the sleep interval, power is removed from the RF components and preamble detector;

and where power to the PLL components is applied a PLL settling time prior to the preamble detection interval and also throughout the preamble detection interval, and power to the PLL components is removed during the sleep interval;

the preamble detection interval comprising a preamble sensing time;

the sleep interval being substantially equal to a preamble duration less two times the preamble detection interval and less a preamble processing time;

and where a preamble processor is powered during the preamble detection interval and is also powered during the preamble processing time if a preamble is sensed, selected fields of the beacon frame being received thereafter by disabling the wireless receiver during fields other than the selected beacon fields.

A sixth object of the invention is a process for detection of a preamble of a beacon frame, the process comprising:

identifying an expected beacon frame arrival time;

a preamble search step where power is repetitively applied to PLL components a PLL settling time prior to the preamble detection interval and during the preamble detection interval and power is applied to RF components, preamble detector components, and preamble processor components during the preamble detection interval and then removed from the PLL components, RF components, preamble detector components and preamble processor components during a sleep interval which follows the preamble detection interval;

and where the sleep interval is not less than a preamble duration less the sum of two times the preamble detection interval and a preamble processing interval;

and where, upon detection of a preamble for a beacon frame, power is applied to the PLL components, RF components, packet detection components and preamble processor only during selected fields of the beacon frame.

SUMMARY OF THE INVENTION

A wireless receiver for a station in a WLAN is powered down except during intervals when a beacon frame is expected. The beacon frame from an AP the station is associated with contains a TIM indicating whether the AP has packets for the station, during which interval the station is powered on to receive packets. The station receiver includes an RF front end, a preamble detector, a preamble processor, a baseband processor, a wakeup processor, and a power controller. The beacon frames include a preamble, start of frame delimiter, MAC source address, and TIM field including a TIM header and TIM bitmap. In one example of the invention, upon detection of a preamble and identification of the beacon frame from a particular AP the station is associated with, the power controller powers down the receiver through parts of the beacon frame, and powers up the receiver to receive the TIM field to determine if the AP has traffic to transmit to the STA. If the AP has a packet for the station, a packet receive event is subsequently scheduled and power is enabled to the receiver to receive such traffic after the beacon frame has completed and the channel is available. The STA receiver thereby is powered down except for the preamble detection interval and the TIM bitmap interval corresponding to the station, as well as any other selected beacon fields. The receiver may be enabled for as little as 1% of the duration of the entire beacon frame, thereby saving 99% of the power compared to receiving all of the fields of the beacon frame, or keeping the receiver powered up throughout the beacon frame. The preamble detection may be performed any of several ways:

a) by comparison of RSSI of the candidate beacon frame with the RSSI of a previous beacon frame from the associated AP, and in combination with the arrival time of the beacon frame compared to the expected arrival time of the beacon frame compared to the previous beacon frame;

b) by examination of the MAC Cntl field to verify the frame is a beacon frame and examination of the MAC SRC address field to verify the frame is from the AP the station is associated with The preamble detection may be performed by waiting until an expected beacon arrival time, thereafter repetitively enabling and disabling the preamble detection part of the receiver for a duration equal to 2*Tpd+Tpp, where Tpd is the preamble detect time and Tpp is the preamble processing time, and detecting the start of packet by either using a preamble detector which searches for the SFD field, or by using a preamble detector which utilizes a method such as receiving a segment of the preamble and cross-correlation with the same SYNC preamble bit pattern to determines where in the SYNC preamble the detected segment lies, and then computing the location of the beacon fields of interest (TIM field, and others) with respect to the preamble segment where the cross correlation was successful.

In another example of the invention, when the station has transmit traffic to send to the AP, the beacon frame length field is acquired using the previously described method of enabling the receiver only during at least the length field, after which the receiver is powered down until the end of the beacon frame, as computed from the length field, and a backoff time has passed, at which time the station powers up and transmits its packets to the AP.

In another example of the invention for detection of beacon preambles, a wireless station receives beacon frames at periodic intervals from which an expected beacon arrival may be determined. A series of preamble detection cycles is initiated until a preamble is detected, each preamble detection cycle comprising a preamble detection interval followed by a sleep interval. Power is applied to phase locked loop (PLL) clock distribution a PLL settling time prior to each preamble detection interval and throughout the preamble detection interval. Power is applied to a receiver and preamble detector during the preamble detection interval, and power is removed from the receiver, preamble detector, and PLL during the sleep interval. The receiver includes an RF front end which receives and amplifies the wireless packet while determining an automatic gain control (AGC) value, convert the packet to a baseband series of symbols using a local oscillator, and present the symbol stream to a preamble detector for detection of a preamble and subsequently to a preamble processor for extraction of preamble characteristics if a preamble is detected. The duration of the preamble detection interval is equal to a preamble sensing interval, and the duration of the sleep interval is equal to the duration of a preamble less the sum of twice the duration of the preamble detection interval plus the duration of the preamble processing interval. When the preamble is detected, the receiver and baseband processor is subsequently enabled only during TIM fields which indicate the AP has traffic for the STA, and optionally during other fields which may verify the received frame is a beacon frame from the AP of STA association, the baseband processor being asleep during other fields of the beacon frame.

A power-save method for a wireless station has a first step of listening for a wireless packet using a receiver and preamble detector, whereby only the receiver and preamble detector are cyclically powered up for a first interval and powered down for a second interval, the first interval substantially equal to the duration of a preamble sensing interval which is substantially equal to the time required for the receiver to reach an operational state after application of power, to perform AGC operations, and to detect the presence of a preamble. If a preamble is detected, power remains applied to the preamble detector and also to a preamble processor which extracts parameters required by a baseband processor for demodulation of the packet. The duration of the preamble sensing interval and preamble processing intervals are specific to the particular preamble sensing and preamble processing methods used. The second interval is substantially equal to the duration of a wireless packet preamble less the sum of two times the first interval plus the duration of a wireless preamble processing interval. After detection of the preamble, the RF front end and baseband processor are enabled only during particular beacon frame fields, and are asleep during other intervals.

BRIEF DESCRIPTION OF THE DRAWINGS

FIG. 3 is a timing diagram for a station operating in infrastructure mode with an access point with wireless interferers.

FIG. 4A shows a diagram of a beacon frame comprising a PLCP part, and a MAC frame part.

FIG. 4B shows a diagram of a MAC header part of FIG. 4A.

FIG. 4C shows a MAC payload (mandatory fields) part of FIG. 4A.

FIG. 4D shows a MAC payload (optional fields) part of FIG. 4A.

FIG. 10 shows a flowchart for processing of beacon frames.

DETAILED DESCRIPTION OF THE INVENTION

Figure 1:
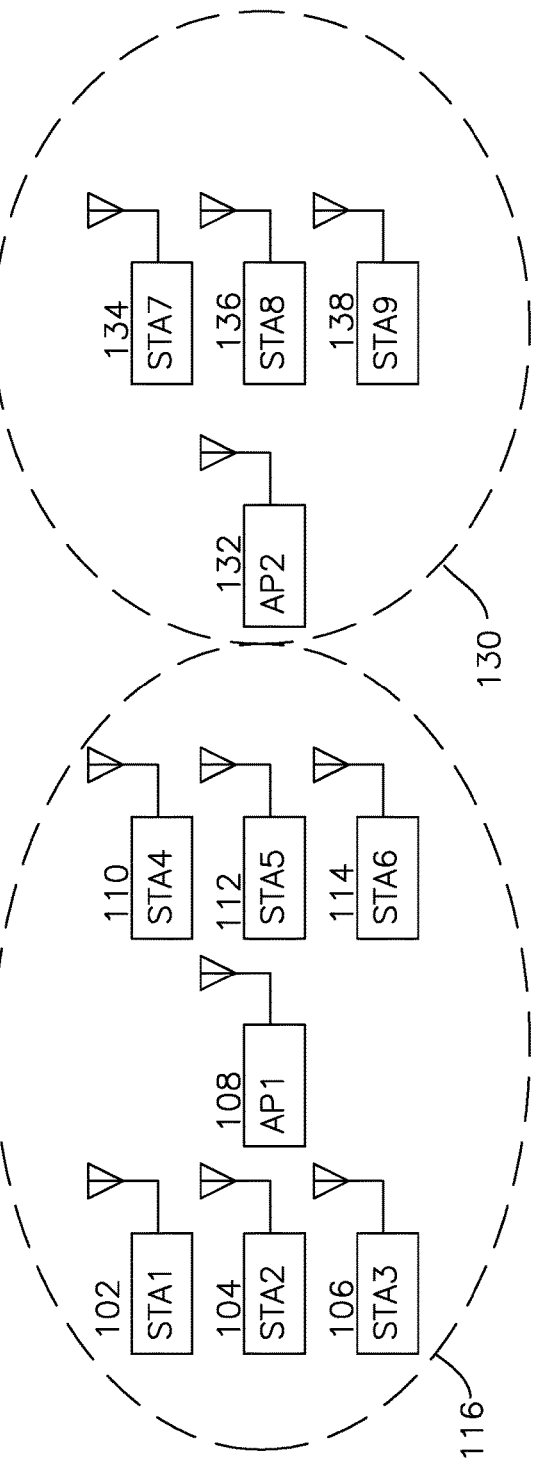
FIG. 1 shows a block diagram of access points and associated stations in an infrastructure mode.

The present invention is operative in wireless local area networks (WLAN) using 802.11, which are understood to be wireless networks compatible with or interoperable with the IEEE 802.11-2012 and predecessor 802.11 standards or devices which meet these standards.

Applicant identifies the following terminology for use in understanding the invention:

A receiver is understood to be any electronic circuitry which can be energized into a power-on state or de-energized into a power-down state for receiving wireless packets and amplifying them. The receiver may include automatic gain control (AGC) operations and the assertion of a preamble detect output as part of preamble sensing. When a preamble is detected, preamble processing occurs which may also optionally include performing channel equalization, center frequency offset correction, and rake training prior to digitization and presentation to a baseband signal processor for demodulation of the packet which follows the preamble. Typically, the receiver also includes a pre-amplifier, a baseband mixer, low pass filters, and analog to digital converter (ADC) with an output coupled to a preamble sensor and preamble processor, and the preamble processor delivers the extracted channel equalization and frequency offset parameters to the baseband processor for demodulating the associated packet. During the preamble sensing interval, the receiver performs automatic gain control (AGC) to place the signal into a suitable dynamic range of the ADC during the preamble interval of a received packet.

A preamble detector of the receiver accepts an amplified baseband wireless signal from the receiver and asserts a preamble detect output upon detection of the preamble part of the wireless packet, with signals the preamble processor to perform channel estimation (also known as an H_matrix) which provides information about the relative phase and gain corrections to be applied to the individual subcarriers, center frequency offset (CFO), symbol timing, and rake training prior to the packet demodulation which is performed by the baseband processor.

Various parts of a wireless receiver may accept a variety of clock signals which are derived from a phase lock loop (PLL) oscillator, and the PLL typically has a settling time after power up before the clock signals are usable for the associated required functions.

The present apparatus and method includes determining the expected arrival of a beacon frame having a preamble, where the apparatus and method includes a preamble detection state when a WLAN packet preamble is received and a preamble detector asserts a preamble detect output in a processing time of substantially 10 us when a preamble is detected. If a preamble is detected, power remains applied to the preamble processor for substantially 28 us for preamble processing to occur, including the extraction of at least a channel estimate, center frequency offset, or rake training, followed by demodulation of particular fields of the beacon frame for which the receiver is powered on. If no preamble is detected, power is removed from the preamble processor and preamble detector until the subsequent preamble detection cycle occurs.

FIG. 4A shows the fields of a beacon frame. All wireless packets begin with a PLCP preamble sequence 404 followed by a start frame delimiter (SFD) 406. For an 802.11 WLAN packet, the PLCP preamble 404 and 406, and PLCP Header: 408 (Signal), 410 (Service), 412 (Length), and 414 (CRC check of the PLCP header) are transmitted at a bit rate of $10^6$ bits per second (BPS), referred to as 1 MBPS. The PLCP preamble and header are followed by the MAC header 416 (shown in FIG. 4B), MAC payload 420 (shown in FIG. 4C), and the mandatory MAC payload fields (shown in FIG. 4C) and optional MAC payload fields (shown in FIG. 4D). The distinction between a beacon frame and other type of WLAN frame is provided by the frame control bits 430 of the MAC header, where the beacon frame control field bits are 0b001000. Note that the representation for numbers follows the syntax for the "C programming language" and its extensions, where the prefix 0b indicates that the digits which follow are binary bits in order of most significant bit (MSB) to least significant bit (LSB), and the prefix 0x indicates hexadecimal digits with the same digit order of MSB to LSB. Short preamble frames (with 96 bits of SYNC 404) are permitted for 802.11b, 802.11g, and 802.11n WLAN packets other than beacon frames, whereas beacon frames of interest in the present invention are required by the 802.11 standard to be transmitted with long preamble only, (128 bits of SYNC) 404 followed by a start frame delimiter SFD 406. The frame control field bits 430 include a version (always 0b00), type (0b00 for management frame), and subtype (0b1000 for beacon frame). As indicated previously, beacon frames are modulated at the lowest available rate, 1 Mbps. As can be seen from the fixed field characteristics FIGS. 4A, 4B, and 4C, it is possible to estimate the interval from the SFD 406 to any other field, as is required for powering up the receiver in time to receive such subsequent field.

The present invention is operative using a preamble detection cycle, which in one example embodiment consists of the cyclical presentation of a preamble detection interval followed by a sleep interval. The first preamble detection cycle is initiated when a beacon frame is expected to be received, since the beacons are transmitted by a remote access point (AP) at regular intervals known to the station. Repeating preamble detection cycles comprising a preamble detection interval followed by a sleep interval, which detection cycles continue until a preamble is detected, at which point power remains applied to the receiver and PLL components through the subsequent preamble processing interval and baseband processor packet demodulation and packet header extraction until it is determined whether a packet is to be received by the STA (typically by a match between the MAC destination address field and the station MAC address), at which time power is applied to the receiver and PLL only during certain selected fields until the desired fields of the packet are received, or where there is no preamble detected or the packet is not destined for the STA, after which the receiver is powered off.

A PLL settling time prior to each preamble detection interval, or any other packet field requiring settled PLL clocks, the PLLs are powered on by the assertion of PLL_Power for a PLL settling time, after which the clock signals distributed through the receiver are stable and the mixer and other components can operate successfully.

The preamble detection interval refers to the interval when power is applied to the receiver (including any required preamplifier, mixer, low pass filter, analog to digital converter (ADC), preamble detector, and baseband processor), and the sleep interval refers to the subsequent interval when power is removed from the receiver and preamble detector. During the preamble detection interval, the receiver, preamble detector, and preamble processor are powered by the signal RX_Power, and during the preamble sensing interval, the preamble detector performs AGC and detects the presence of a preamble during the preamble sensing interval. If a preamble is detected, power is then applied to a preamble processor which operates over a preamble processing interval, during which time center frequency offset, channel equalization, and rake training occur, but the preamble processing interval only occurs if a preamble detect occurs during the preamble sensing interval. Following the preamble processing, the b_CFO, b_AGC, b_RSSI, b_H_matrix, and b_sym_timing fields or values from the preamble are extracted and saved for future use in this beacon packet or in a subsequently received data packet. Prior to the preamble detector or preamble processor becoming operational after application of power, there are several sources of initialization delay, each with a separate time constant, but these initialization delays are associated with the receiver being in an operative state to receive any incoming beacon frame preamble, which requires the clock distribution be settled and stable, which is associated with phase lock loop (PLL) settling time for a multiplied clock provided to the receiver or preamble detector after application of PLL_Power to the PLL circuits.

FIG. 1 shows wireless devices 116 operating in 802.11 WLAN infrastructure mode including access point AP1 108 and associated stations STA1 102, STA2 104, STA3 106 STA4 110, STA5 112, and STA 6 114, which are associated to the access point AP1 108 according to the WLAN association procedure of IEEE 802.11, either by passive association, where the STA joins the AP via an association request, or by an active association, whereby the STA joins the AP using a probe command, as described in 802.11. Nearby stations STA 7 134, STA8 136, STA9 138 are associated with access point AP2 132 which is also operating in an IEEE 802.11 infrastructure network 130 unrelated to infrastructure network 116.

Figure 2:
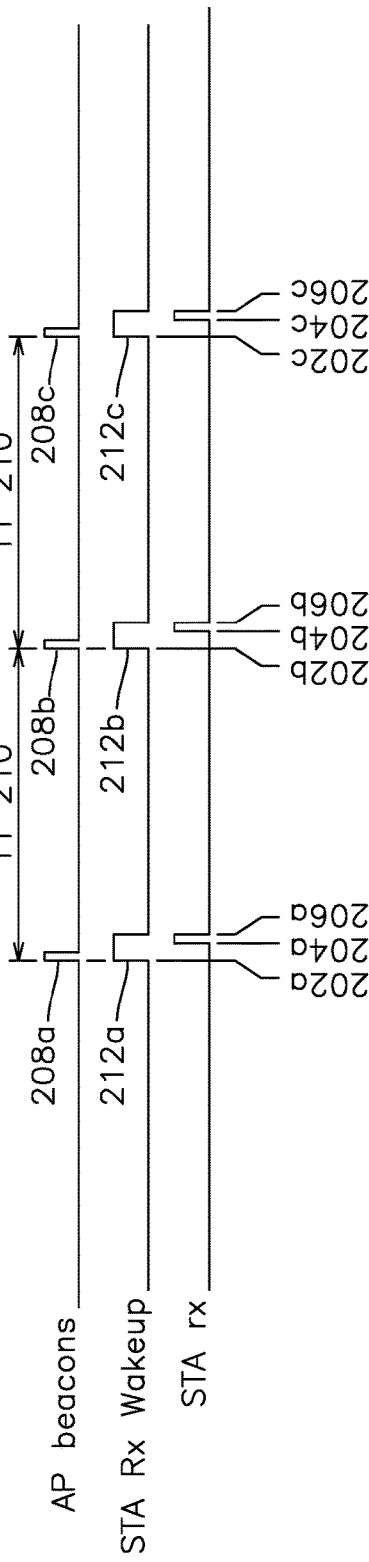
FIG. 2 is a timing diagram for a station operating in infrastructure mode with an access point.

FIG. 2 shows a timing diagram for a communications protocol of a wireless local area network access point such as FIG. 1 AP1 108 operating with an example station STA1 102. Periodic beacon frames 208*a*, 208*b*, 208*c*, etc are transmitted a uniform time interval T1 210 from each other. According to the IEEE 802.11 WLAN power-saver protocol, the station wakes up at intervals 212*a*, 212*b*, and 212*c*, and the WLAN station receives frames, and if the station STA has any frames to transmit, does so at indicated times 204*a*, 204*b*, 204*c*, etc. The operation of FIG. 2 provides improved efficiency and reduced power consumption, as the STA receiver uses internal circuitry to generate a wakeup signal, and it is only consuming power when powered up for transmit/receive operations. FIG. 2 shows a STIM interval of 1 (powering up once for each beacon), but the STA may elect to power up once every several beacons, as identified in the DTIM map.

Whereas FIG. 2 shows a best-case scenario without interferers or congestion, FIG. 3 shows the reduction in power-saver mode efficiency when interference from non-associated stations or an unrelated AP which operates on the same channel is present. The access point 108 sends beacon 310 of FIG. 3 with the intention of sending the next beacon 322 after interval T1 301. However, because of interference from non-associated stations 134, 136, 138 and access point 132 sharing the same channel, WLAN packet 320 is unsynchronized with AP beacons 311 since it is not part of the infrastructure of the AP generating beacons 311 of FIG. 3.

Another source of delay is clock accuracy. A typical wakeup clock may be ±40 parts per million (PPM), which corresponds to 4 us over a 100 ms beacon interval, or 40 us for a is beacon interval. Accordingly, the wakeup-time must be adjusted for beacon interval, clock accuracy, and congestion delays. The stations or access points generating unrelated traffic are known as an interferers, which triggers the transmission back-off mechanism of IEEE 802.11, which delays the transmission of regular beacon 322 to time 324 to avoid interfering with the reception of WLAN packet 320. Through this back-off interval, the STA receiver is awake from the expected beacon arrival 322 until its actual arrival 324, shown as STA_Power_On 326, remains asserted during extended window 328 until the channel is clear, at which time any receive packets 332 from the AP may be received and packets transmitted by the STA. An extended delay 343 is shown to occur on the subsequent beacon 340 arrival time, which is expected to occur a beacon interval T1 303 after previously transmitted beacon 324. The station takes note of the delayed beacon 340, and resets its wakeup timer to the expected arrival time of beacon 324 (with the delay T1 determined by the timestamp contained in each beacon), and asserts power-on 342, enabling all receiver circuitry in preparation for the next beacon. However, because of additional adjacent-channel interferers 341 or clock variations, the beacon 348 is additionally delayed, and the RX Poweron signal 343 is also extended, during which time receiver power is being consumed, but no packet has arrived to be received until the end of the interval 346. During this entire extended interval 343, the station WLAN receiver circuitry remains enabled and consuming power, which is the primary problem of power saver operation in a congested network or networks with channel interferers.

FIGS. 4A, 4B, 4C, and 4D show the 802.11 WLAN packet frame format. FIG. 4A shows a long preamble packet 402, which comprises, in sequence, 144 bits of SYNC 404 at 1 MBPS using Differential Binary Phase Shift Keying (DBPSK) modulation, followed by 16 bits of SFD 406, followed by 8 bits of signal 408, 8 bits of service 410, a length field 412, a CRC 414 which operates over the header, the MAC header 416, MAC payload 420, and field check sum FCS which operates over the MAC header 416 and payload 420. As indicated previously, beacon and control frames are transmitted using 1 MBPS payload modulation, and these legacy packet types (compared to modern WLAN data throughputs of 802.11b, 802.11g, and 802.11n higher throughput modulation methods) are transmitted using long preamble only, as required by the 802.11 standard. FIG. 4B shows the fields of the MAC header, including the Frame control 430 which identifies WLAN packet type (including beacon frame), duration 432, MAC destination address 434, MAC source address 436, the BSSID 438, and segment control 440. The mandatory MAC payload fields are shown in FIG. 4C, and include the timestamp 442, beacon interval 444, capability 446, SSID 448, and supported rates 450. The optional MAC payload fields are shown in FIG. 4D, the one of primary interest is the traffic indication map TIM 460, the other fields are shown for reference.

Figure 7:
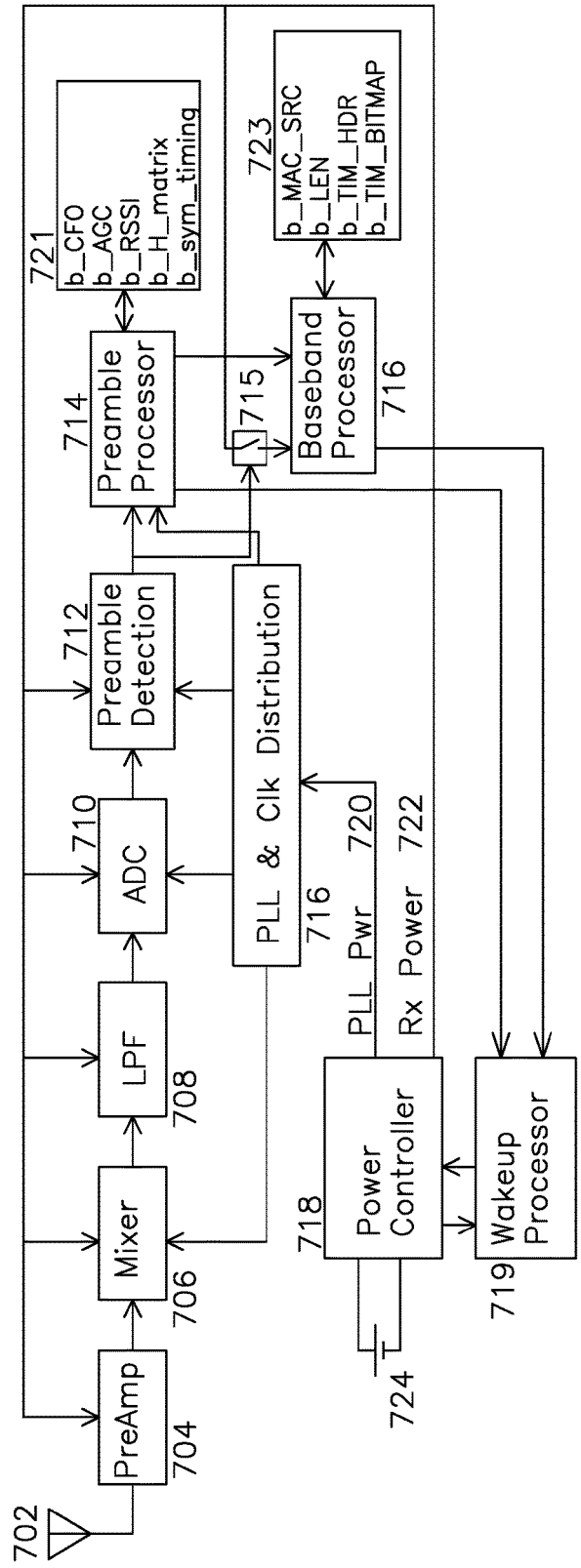
FIG. 7 shows the block diagram for a receiver operating according to an example of the present invention.

FIG. 7 shows the block diagram of a station receiver which may be operative according to one example of the invention. Power is furnished by battery 724 where the objective is to maximize battery life through minimal power consumption. A wakeup processor 719 enables power to the various functional blocks, applying PLL power early to account for PLL settling times and initialization intervals prior to processing of a particular packet field. The station 700 is operative in an IEEE 802.11 infrastructure, and wakes up prior to when a beacon frame is expected to arrive. Wireless packets are received and transmitted on antenna 702, but for clarity, only the receive components of the system are shown in FIG. 7. Wireless packets received on antenna 702 are directed to a preamplifier 704 where they are amplified, passed to mixer 706 for baseband conversion, filtered by low pass filter 708, and digitized by analog to digital converter (ADC) 710, after which a preamble is detected 712 for an exemplar preamble sensing time of 10 us during which time AGC is performed and preamble detect is asserted. If preamble detect is asserted, preamble processor 714 is operative for an incremental exemplar preamble processing time of 28 us after preamble detect assertion 712, during which time channel estimation, center frequency offset, and rake training are performed, each of which is used by the baseband processor 716, which is not powered on 715 unless preamble detection occurs. If the arriving frame is a valid packet such as part of the expected beacon frame, the packet sent to a baseband processor for demodulation 714. A power controller 718 applies power 720 to the phase lock loop (PLL) and clock distribution 716 prior to the arrival of the expected beacon frame for the clock signals to settle, and shortly afterwards, power to the remaining receiver components 722 is applied, as well as prior to subsequent packet field processing. The preamble processor 714 may have optional memory for storage and subsequent use of beacon parameters, including: b_CFO (center frequency offset), AGC value (for use as an initial value for detection of subsequent beacon frames or fields), b_RSSI (receive signal strength indication), b_H_matrix (equalization matrix), b_sym_timing (symbol timing). Similarly, the baseband processor 716 may save fields related to the MAC fields, including b_MAC_SRC indicating the source address of the beacon, b_LEN indicating the length of the packet (parts of the PLCP preceding the MAC frame), and b_TIM_HDR, and b_TIM_BITMAP which indicate whether the AP has packets to transmit to the station, and the particular timeslot assigned by the AP for this activity.

Figure 5:
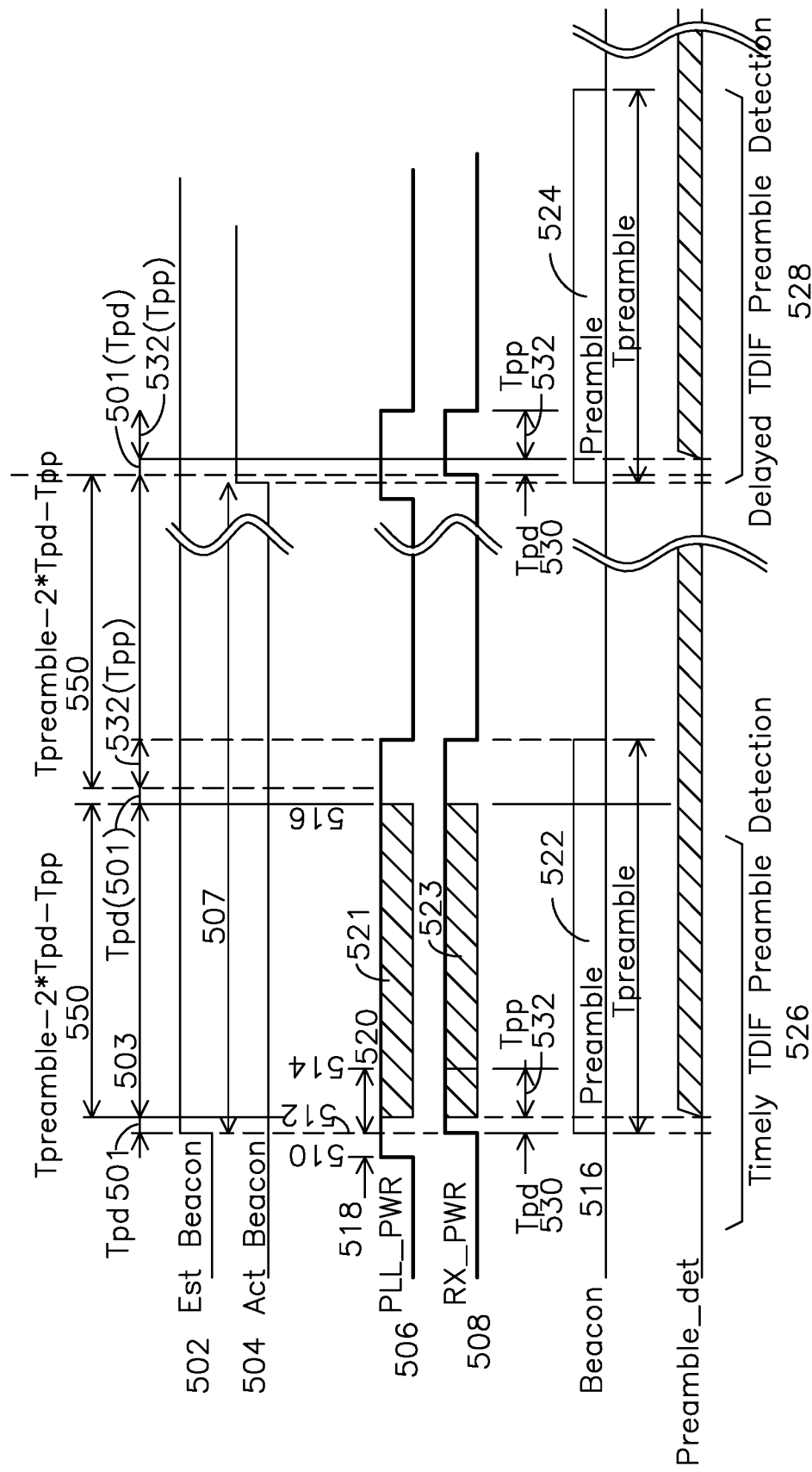
FIG. 5 is a timing diagram for a receiver preamble detection.
Figure 8:
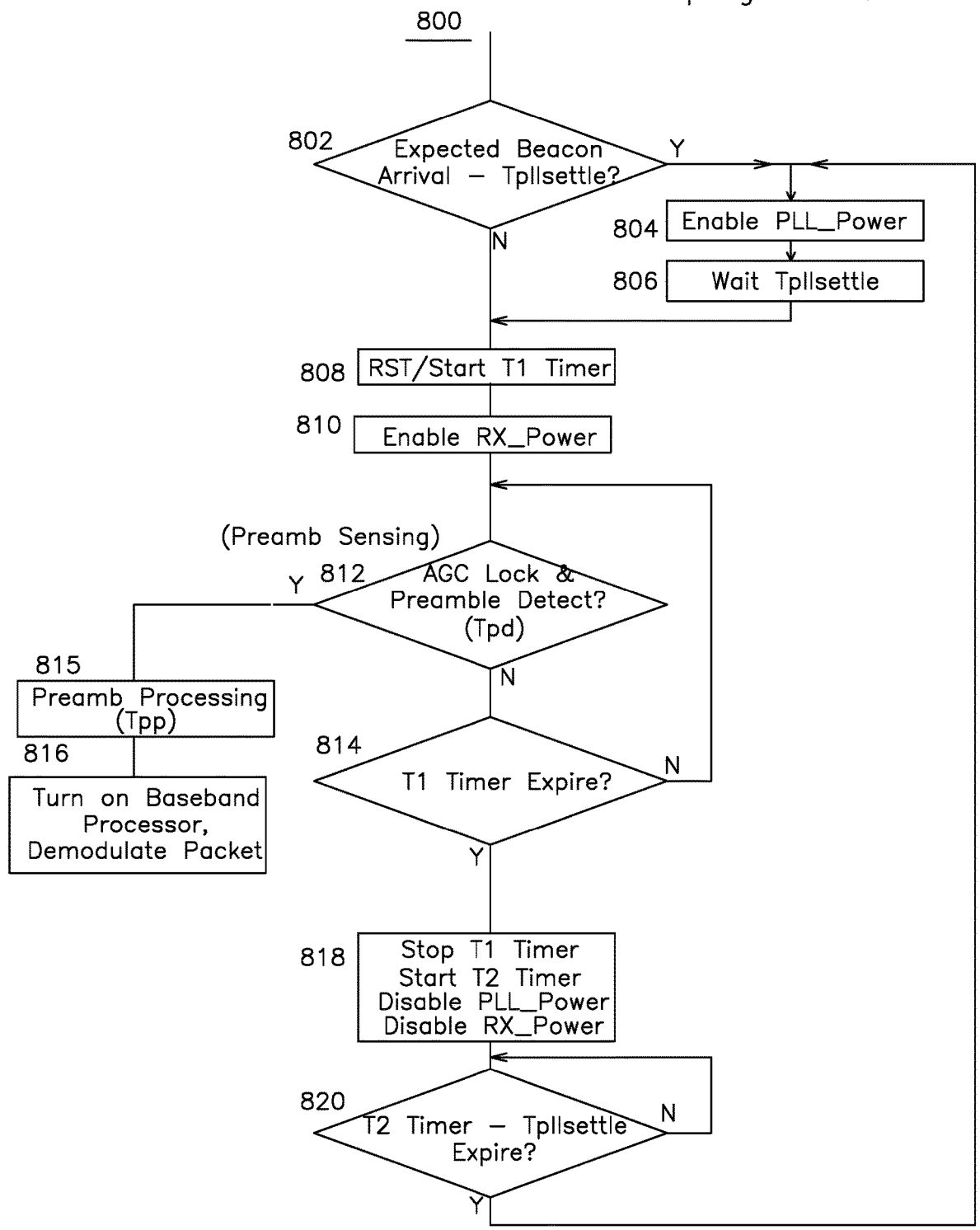
FIG. 8 shows a flowchart for a beacon preamble detection sampling process for preamble detection.

FIG. 5 shows the timing rationale for the receiver preamble detection apparatus and method such as the apparatus of FIG. 7 and related method of FIG. 8. A long preamble such as from a beacon frame will be 128 microseconds long (128 bits at 1 MBPS), each preamble prepended to a 16 bit start of frame delimiter (SFD). An exemplar preamble detector typically only requires a preamble sensing or preamble detection interval Tpd of substantially 10 microseconds to perform AGC and detect preamble, with an additional preamble processing time Tpp of 28 us to perform center frequency offset (CFO) correction, rake training, and tracking loop convergence, which provide prerequisite information used by the baseband processor to demodulate the packet and extract the payload information. As the preamble is longer than required for detection, the receiver and preamble detector may be powered on as shown by the bold line of Rx_Power 508 during the preamble detection interval 530, and if a preamble is detected, RX_Power 508 remains applied through the preamble processor interval Tpp 532. The preamble detection interval 501, which is the maximum interval of time power is applied to the receiver if no preamble is detected is equal to the preamble sensing interval Tpd. If a preamble is detected, a subsequent preamble sensing interval Tpp occurs. If preamble detect is not asserted at the end of the preamble sensing interval Tpd 530, PLL_Power and RX_Power are powered down and the sleep interval 503 follows, as shown by the hashed regions 521 and 523 for PLL_Power and Rx_Power, respectively. By careful selection of sleep interval 503 to allow two preamble detection intervals 501 plus a preamble processing interval which span the duration of the long preamble 522 of a beacon frame, and with specific knowledge of the receiver and preamble detector response time (provided as substantially 10 us in the present example) and preamble processing time (provided as substantially 28 us in the present example), if no preamble is detected during Tpd 530, it is possible to power-off the receiver during the preamble processing interval 532 and sleep interval 503, thereby assuring that a transmitted preamble from an AP beacon frame will not be missed, and the receiver need not be powered up continuously during this interval while waiting for the beacon frame to arrive. Because the reception of WLAN beacon packets is asynchronous to the Rx_Power signal 508, it is important to provide a minimum of two complete preamble detect intervals Tpd and one preamble processing intervals Tpp during a preamble 522 interval Tpreamble. Additionally, power to the PLL (PLL_Power) 506 is provided a PLL settling (Tpllsettle) time 518 prior to the preamble detection interval 501. An example Tpllsettle of 6 us is provided in the current examples for understanding the invention. The detection of a preamble enables power to the preamble processor and other components of the receiver until it is determined that a packet is to be received by the current station according to the received beacon TDIM map, or it is determined that no such packet is to be received, at which time the receiver is powered down until the next expected arrival 512 of a beacon frame. Detection of a preamble is followed by selective power-up and sleep modes to receive and ignore subsequent fields of the beacon upon successful preamble detection.

Timely preamble detection shortly after the expected arrival of a beacon frame is shown 526, as well as delayed beacon frame packet detection 528 which occurs many preamble detect cycles after the estimate beacon arrival time 512.

Figure 6A:
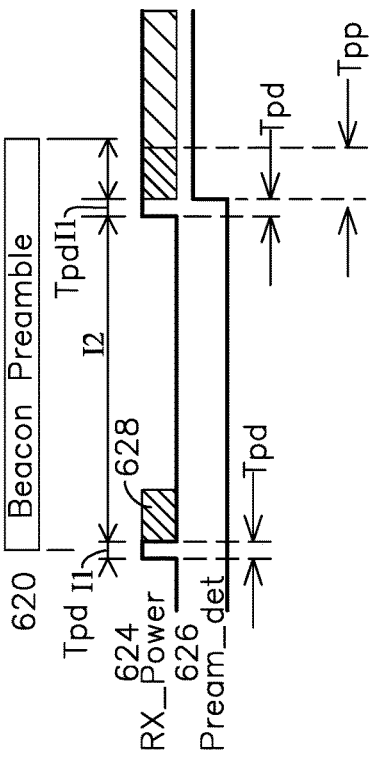
FIG. 6A is a timing diagram for early detection of a preamble according to the invention.
Figure 6B:
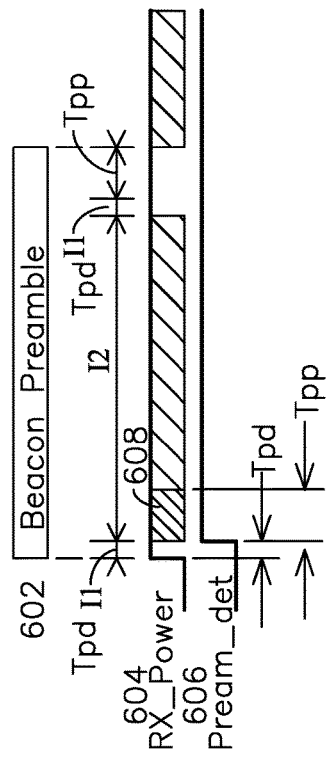
FIG. 6B is a timing diagram for late detection of a preamble according to the invention.

FIG. 6A shows a timing example for the earliest possible preamble detection in a preamble detection cycle, with a preamble 602 arriving with sufficient time Tpd during the first preamble detection interval I1 to assert preamble detect 606 early in the cycle, and shows the subsequent preamble processing interval 608. FIG. 6B shows a timing example for the latest possible preamble detection of a preamble detection cycle, where the first RX_Power 624 assertion for the duration Tpd occurs too early in the preamble for preamble detect 626 to occur (and power is removed from the preamble processor during 628), but the preamble detect 626 is asserted Tpd after the second assertion of Rx_Pwron 624 during the preamble 620.

In one example embodiment of the invention, the PLL settling time 518 of FIG. 5 (governed by PLL lock time to provide a sufficiently stable clock signal for the receiver components such as mixers and ADCs to operate and sample uniformly) is 6 us representing 510 of FIG. 5A, and Tpd 530 of FIG. 5A is 10 us, and the Tpp operations of CFO (with value b_CFO), channel equalization (with value b_H_matrix), symbol timing (with value b_sym_timing), and preamble detection represented by 532 is 28 us, so the preamble detection interval 501 is 10 us. For a long preamble 522 of 128 us, the sleep interval 503 is 128 us-2*10 us-28 us=80 us. Since a late beacon arrival results in RX_Power only being cyclicly applied for Tpd of 10 us over the interval of Tpd of 10 us plus the sleep interval of 80 us, the power consumption of the present invention when a beacon frame arrives late is therefore 10/90=11% (less than ⅕th of the power) compared to the prior art method of leaving the receiver operative until a preamble is detected. Generally, the beacon preamble detection power savings is Tpd/(Tpd+Tsleep). Similarly, the PLL clock tree is only enabled for (Tpllsettle+Tpd)/(Tpd+Tsleep), or 16/90=17% or less than ⅕th of the prior art for power consumed during intervals of delayed beacon frames.

FIG. 8 shows the preamble detection of beacon frames as a process 800 of the present invention. At step 802, a controller anticipates the expected arrival of a beacon by enabling PLL_Power 804 a PLL settling time Tpllsettle prior to the expected arrival of the beacon. After enabling PLL_Power 804, and waiting for PLL_Power to settle 806, a T1 timer 808 is started and RX_Power is enabled 810. A loop of checking for Preamble Detect 812 and T1 timer expiration 814 occurs until either a preamble detect is asserted leading to preamble processing 815 and packet demodulation 816, or in the case of timer T1 expiration where a preamble does not arrive during the Tpd interval, the sleep cycle of 818 and 820, during which sleep interval PLL_Power and RX_Power are removed. A PLL settling time Tpllsettle prior to the end of the sleep interval, PLL_Power 804 is enabled shortly prior to the next preamble detection cycle starting at step 808.

In an additional aspect of the invention which may be practiced separately, or in combination with the previously described preamble sampling technique of FIGS. 5, 6A, 6B, 7, and 8, a beacon frame processor may detect preamble as previously described after powerup of the beacon processor at an expected interval based on the beacon interval and an internal timer of wakeup processor 719 which indicates when a beacon interval has passed, enables the beacon processor to wake up and begin sampling for a preamble. Following the preamble detection, the beacon frame processor is powered down and in a sleep mode except when powered back up and enabled for the acquisition of certain desired fields of a beacon frame. Power is enabled only during the preamble sample intervals followed by enabling power only during the particular packet fields of interest, specifically the segment of the TIM bitmap field which indicates AP traffic is awaiting reception by the particular station. In this example of the invention, the receiver and beacon frame processor are only enabled during the particular corresponding fields and segments (fragments of a field) of the beacon frame packet, which may include the TIM interval, and optionally the MAC Source address, or optionally the RSSI and externally measured beacon frame timestamp to infer that the MAC is likely from the AP, without reading the MAC source address and control frame to verify it is a beacon or the intended AP.

Figure 9A:
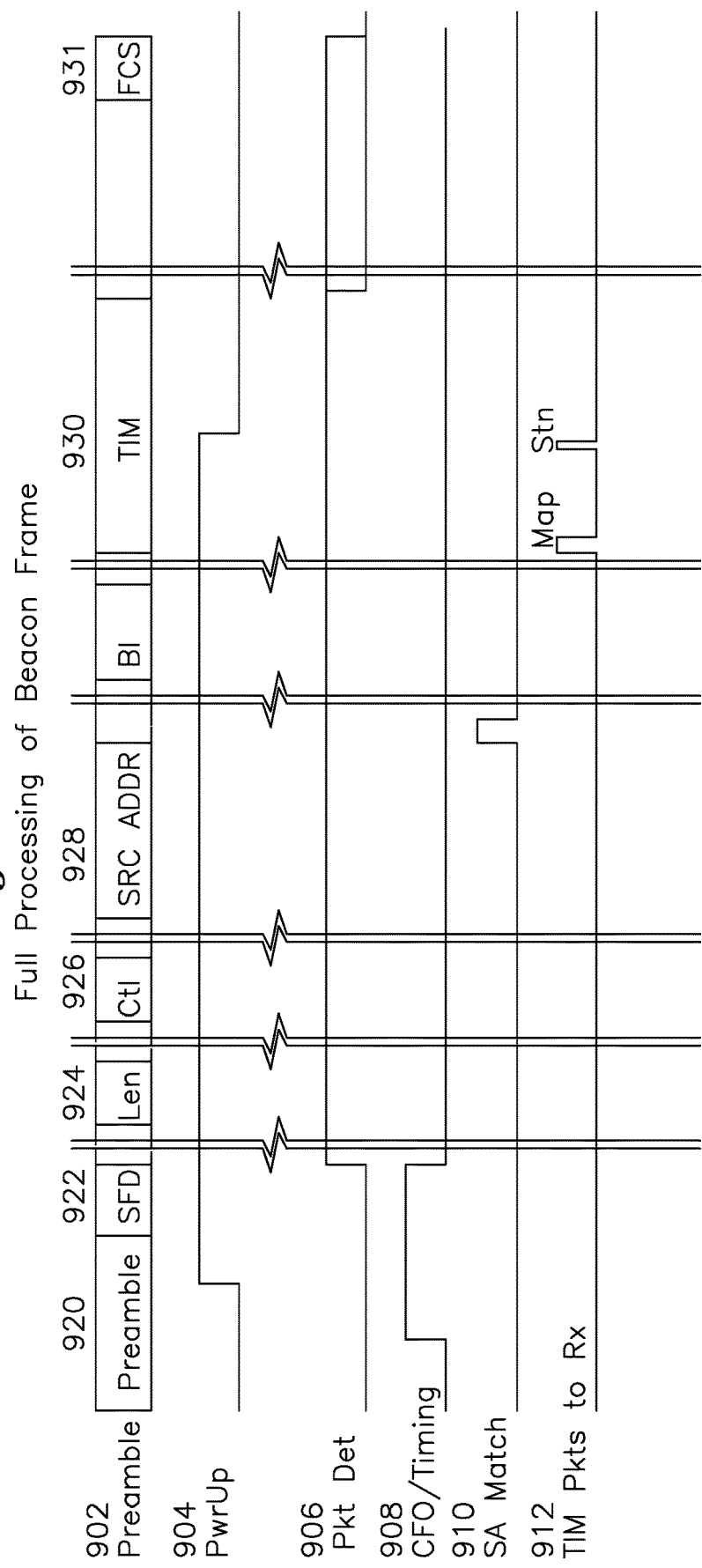
FIG. 9A shows a timing diagram for reception of a beacon frame.
Figure 9B:
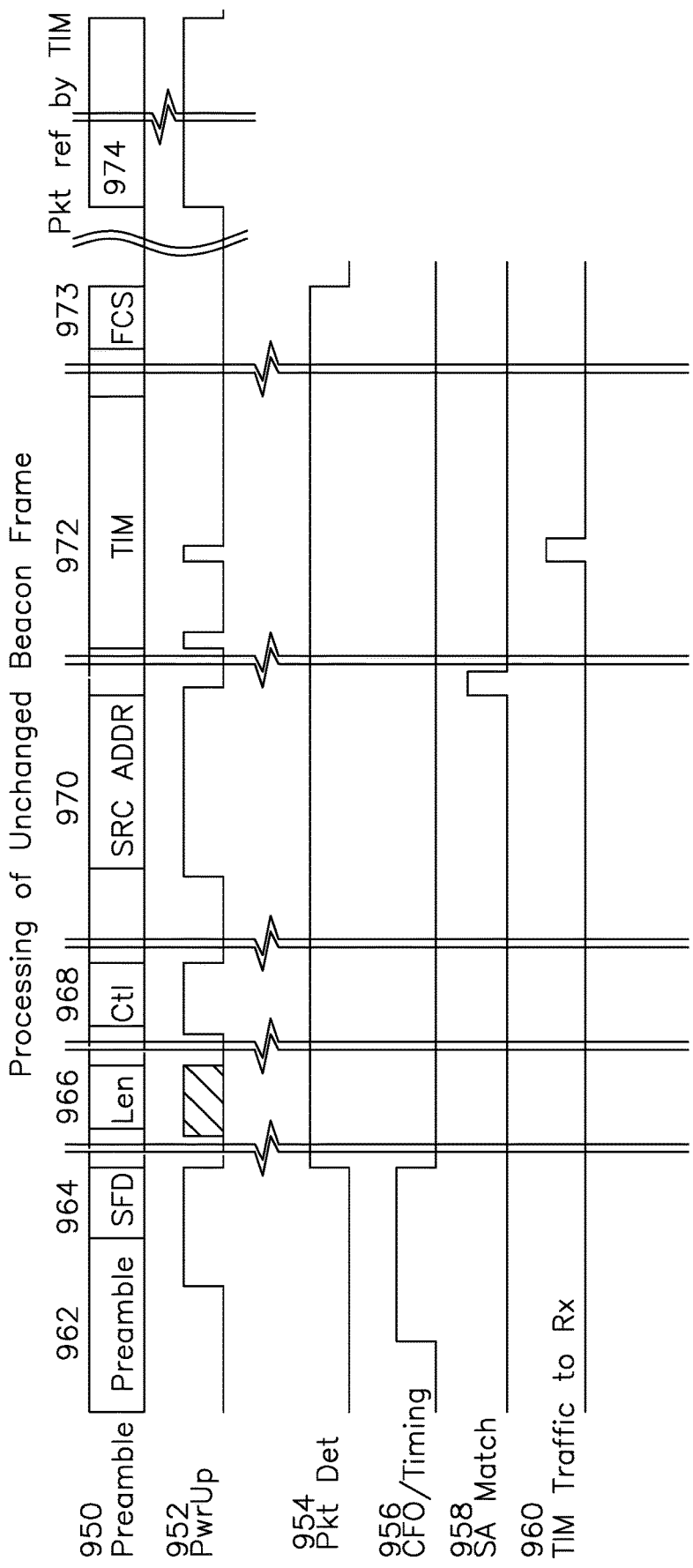
FIG. 9B shows a timing diagram for reception of a beacon frame according to an aspect of the invention.

FIG. 9A shows a sequence and time diagram of reception of an initial beacon frame, where all of the required information fields are received in sequence (as described in FIG. 4A), or alternatively a subset of fields which include at least one of:

preamble 920 detection with 922 SFD, including optionally the RSSI (received signal strength), CFO (center frequency offset), and symbol timing, from which b_RSSI, b_CFO, b_sym_timing, as well as b_AGC and b_h_matrix may be saved;

the PLCP length field 924 (indicating packet length), which may be used to determine the end of the current packet, so that the receiver may be turned off after the last required field of the packet is captured and transmitted packets may be sent a backoff time following the end of beacon frame, which is computed based on the length field 924;

the MAC control field 926 (indicating the frame is a beacon frame);

the MAC Src Address 928 (b_MAC_SRC, identifying the frame as from the AP of interest);

Beacon Interval (indicating how often beacons are transmitted) and Traffic indication map 930 which includes a TIM header (b_TIM_hdr) and a TIM bitmap (b_TIM_bitmap) indicating whether a station has packets to receive;

FIG. 9B shows the processing of beacon frames, where the information from a previous beacon frame of FIG. 9A is utilized. The receiver powers from a power-down sleep state a beacon interval after a preceding beacon, detects preamble 962 and SFD 964, turns on again to receive LEN 966 (optionally only if the station has one or more packets to send), goes to sleep, and powers up for the Ctl 968 which indicates a beacon frame, powers up for the source address 970 which verifies the beacon frame source is the AP the station is associated with, traffic map header which describes the organization of the TIM bitmap of 972, and the TIM bitmap which indicates that the station has TIM traffic to receive 960 from the remote AP sending the beacon frames. Power On 952 indicates the intervals when the receiver is powered up and acquiring packet fields, as well as sleep state (power-down) intervals.

Ordinarily, the decoding of a WLAN Beacon frame is done from start to finish of the WLAN beacon frame. In order for the receiver to power-on during the middle of the WLAN frame and successfully decode particular fields of the WLAN frame, the beacon frame processor must be possessed of the channel characterization matrix (referred to as the "H matrix", as well as the center frequency offset, symbol timing, and RSSI. Typically, for a static configuration, these values change very little from packet to packet, and may be reused by the receiver for demodulation of the incoming data within the same beacon frame, or as an initial value for a new frame. It may be beneficial for the receiver to receive and fully decode all of the fields of a single beacon frame from time to time, perhaps as frequently as once every 10 beacon frames.

Figure 9C:
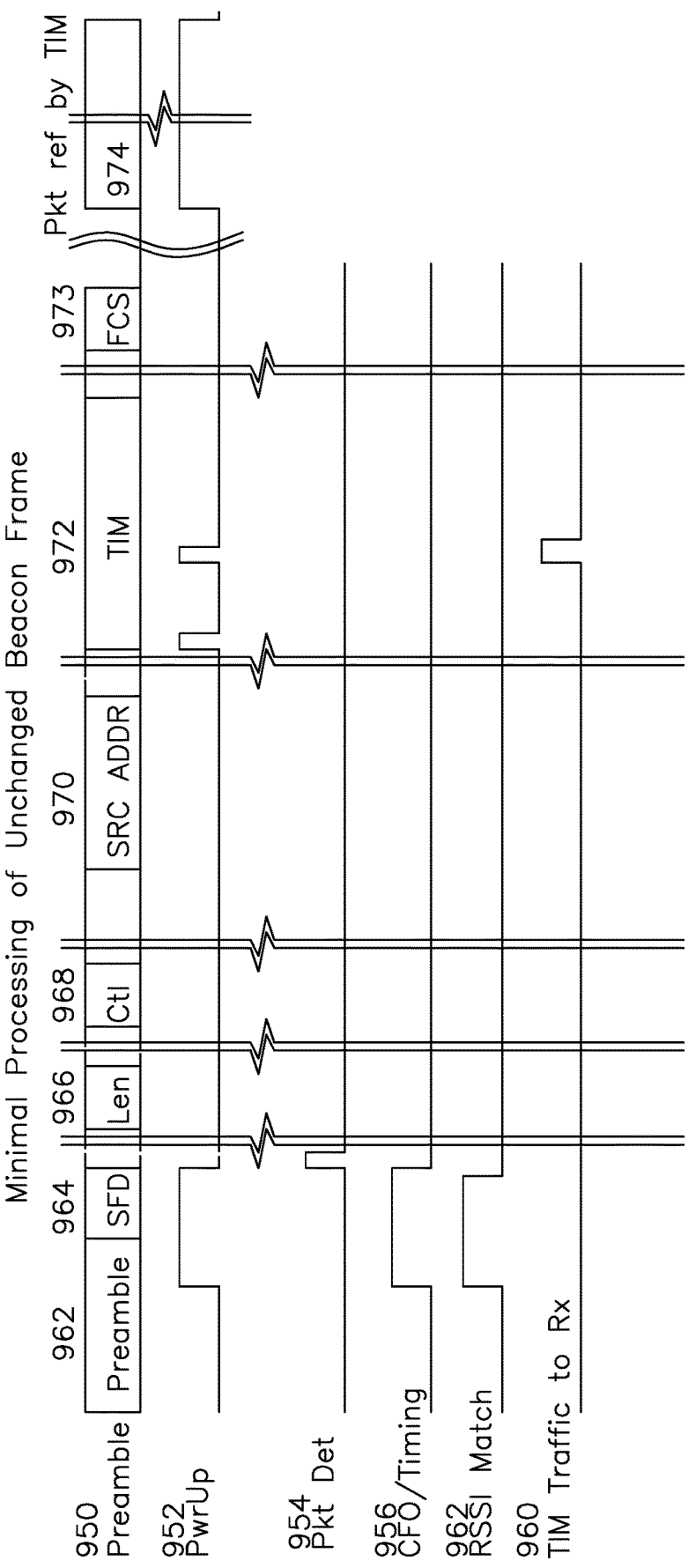
FIG. 9C shows a timing diagram for reception of a beacon frame according to another aspect of the invention.

FIG. 9C shows an aspect of the invention where the beacon frame processor only checks for preamble (optionally according to the method of FIG. 8). In this example, Power On 952 is only active to detect the preamble, and thereafter is only active for the TIM header and TIM bitmap of field 972.

In FIG. 10, the process 1000 starts 1001 with the beacon processor having received a previous beacon frame and established the beacon interval, as well as certain other parameters which are saved locally, including the beacon signal strength (b_RSSI), the beacon frame MAC source address (b_MAC_SRC), the traffic indication map (TIM_hdr and TIM_bitmap), and packet length (b_LEN). The TIM_bitmap field may increase or decrease with the addition or removal of stations, which can be eliminated by acquiring b_TIM_hdr which indicates the traffic bitmap. When the beacon interval is established, the receiver sleeps in step 1002 to disable the receiver until the expected arrival of a subsequent beacon frame, at which time the receiver is powered up 1004. At step 1005 the receiver is enabled only for the PLCP length and MAC control frame intervals, the MAC control frame indicating that the frame is a beacon frame so that if the receiver powers down for the end of the packet, the controller can determine when to power back up and begin transmission of any WLAN frames designed for the AP. The TIM header and TIM_bitmap may be read in step 1006. TIM bit corresponding to the station is then read, and if the AP has traffic ready to be received, the station goes back to sleep 1002 until the time indicated by the TIM_bitmap. If the station has frames to transmit to the AP, this occurs after the end of the beacon frame 1022, as indicated by the b_Len field saved from the previously received beacon frame.

Figure 11A:
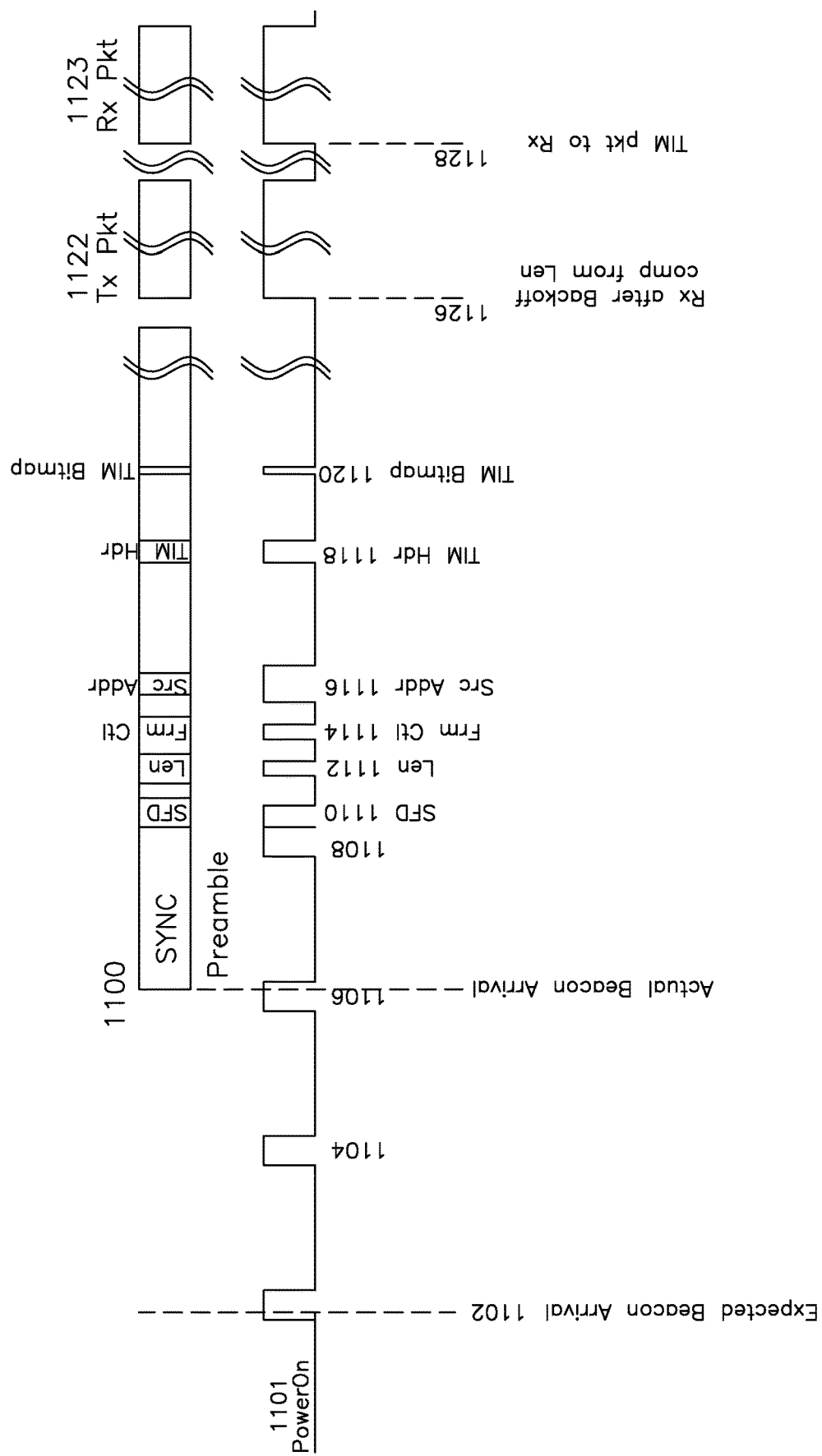
FIG. 11A shows preamble sampling and field selective power-on used together.

Additionally, the mechanism of the beacon processor powering up only for the TIM field may be combined with the preamble sample process of FIG. 8, as shown in FIG. 11A. During an expected beacon arrival time 1101, the preamble sample power-up method of FIG. 8 is used, whereby the receiver is powered on at intervals 1102, 1104, 1106. Shortly after time 1106, a beacon frame preamble is detected at time 1108, and the beacon frame processor remains enabled through SFD 1110, then the receiver powers up long enough to capture the Length 1112 (only if a packet is to be transmitted to the AP by the station—which requires b_LEN to compute end of beacon frame), Frame control 1114, MAC source address 1116, TIM header 1118, and TIM_bitmap for the station 1120 indicating whether the AP has a WLAN frame for the station. If a packet is to be transmitted by the station, this is done at time 1126, using the estimated length of packet 1100 as indicated by the Len field read at time 1112, and if the TIM map indicates a WLAN frame to be received by the station, this occurs at the designated TIM time 1128.

The following variations to the invention may be practiced to accomplish significant power savings in the reception of beacon frames:

1) Sampling of beacon frames by applying power periodically to the receive processor as was described for FIGS. 6A, 6B and the method of FIG. 8 until a preamble is detected;

2) Upon detection of preamble, either
   a) matching the actual and expected arrival time, comparing_RSSI to the RSSI of the received preamble, or
   b) subsequently enabling the receiver to test the MAC_CTL field for a beacon frame and also comparing the MAC_SRC to the AP of station association, turning off the receiver if no match is found;

3) If the station has packets to be transmitted, enabling the receiver and reading the LEN field to form an estimate of a transmit interval which follows the beacon frame by a backoff interval;

4) Enabling the beacon processor to read the fields of the TIM header of the beacon frame;

5) Enabling the beacon processor to read the TIM bitmap to determine a receive interval for the station;

6) Enabling the receiver during the receive interval for the station;

7) The receive processor being powered down at other times.

Figure 12A:
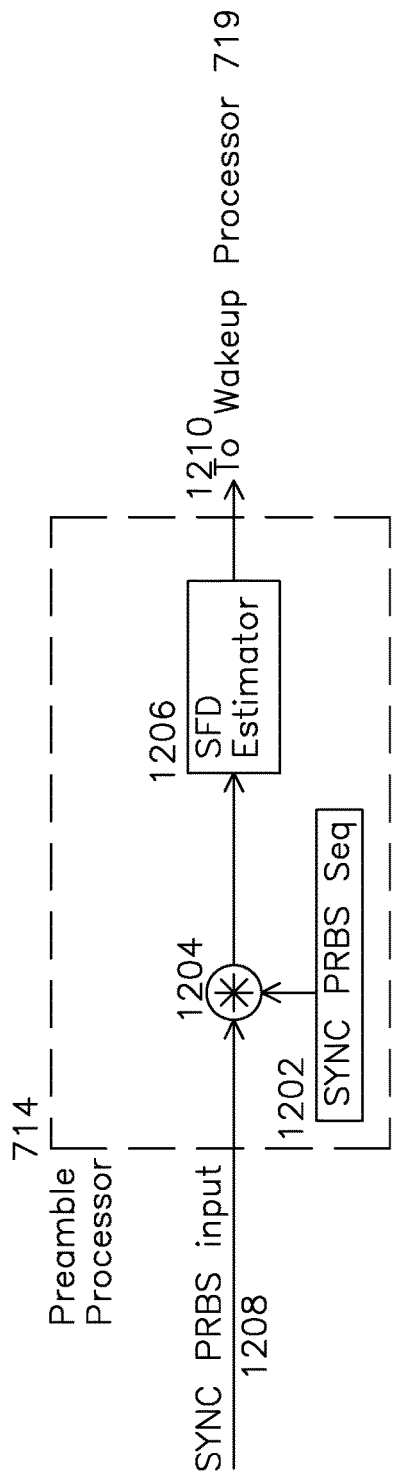
FIG. 12A shows a cross-correlating preamble processor.
Figure 12B:
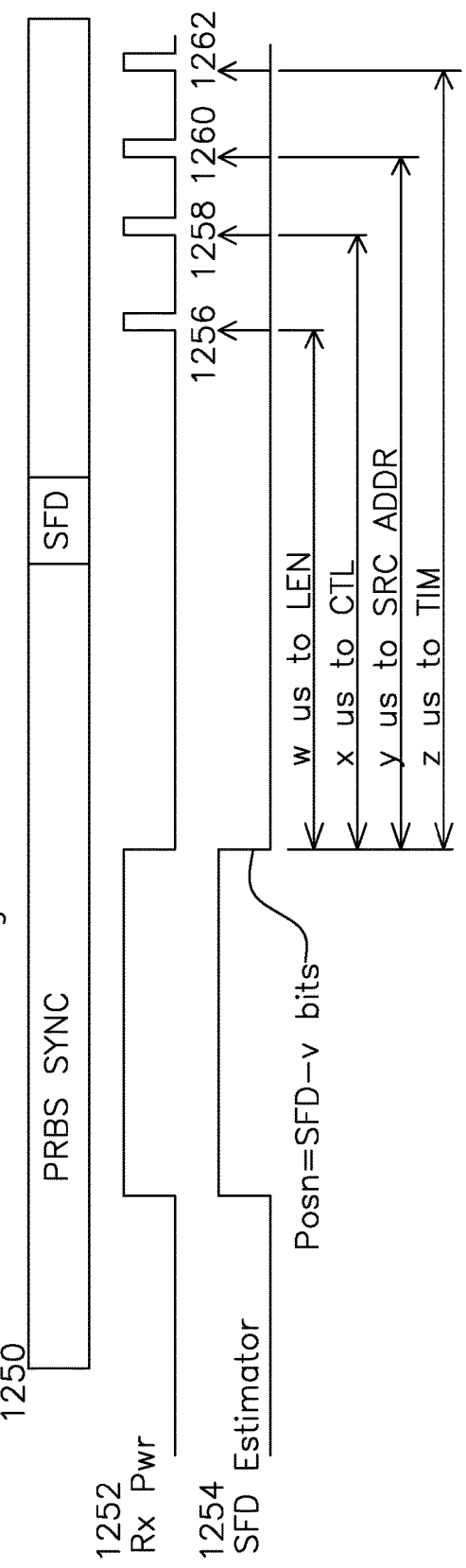
FIG. 12B shows a timing diagram for a cross correlating preamble processor.

Several additional variations of the invention may be practiced for the preamble detection process. In a first example of the invention, the start of frame is detected by resolving the SFD field, as is known in the prior art and described in the IEEE 802.11 standards. A second method which can save additional power is shown in FIG. 12A, where a cross correlation 1204 of the incoming preamble PRBS 1208 with the PRBS from which it is derived 1202 is performed. By cross correlation 1204 of the received preamble 1208 with the PRBS sequence 1202, the position of each subsequent field with reference to the FCS may be determined by counting bits in the beacon frame at 1us per bit, starting from the FCS or fragment cross correlation, as shown in FIG. 12B. Using this technique, a small number of preamble bits may be read sufficient to uniquely determine the current position in the preamble, and thereafter to program the intervals for power-up of the receiver. FIG. 12B shows the time diagram of FIG. 12A, where v=# preamble bits to SFD, w, x, y, and z are us separation distances from SFD to the respective beacon fields length, control, MAC source address, and TIM.

The examples of the present invention are shown for illustration only, and are not intended to limit the scope of the invention to only those examples described. For example, there are many different time durations associated with AGC lock, CFO estimation, channel estimation, and preamble detection. The example PLL settling time of substantially 6 us, the example packet detection which includes CFO, Rake training, channel estimation, and packet detection may be substantially 28 us each may vary by +/−50%, and accordingly the use of "substantially" with respect to a particular time duration is understood to include a variation of as much as +/−50%.

We claim:

1. A wireless receiver for WLAN beacon frames comprising:
   a power controller for coupling a power source to a receiver comprising a preamble detector, a preamble processor, a baseband processor, and a wakeup processor;
   the power controller providing power to a preamble detector upon expected arrival of a beacon frame;
   the preamble detector examining an incoming packet for a preamble and determining the start of a packet and asserting preamble detection by cross correlation of a preamble fragment from the incoming packet with a preamble-generating polynomial output, and using a peak result of the cross correlation to estimate a start of frame to powerup the receiver for extracting fields which follow the preamble fragment;
   upon the assertion of preamble detection, the receiver subsequently determining whether the packet is a beacon packet from an access point the station is associated with;
   upon determination that the packet is a beacon packet from an access point the station is associated with, the wakeup processor determining a wakeup time for the receiver during a TIM field of the beacon frame and putting the receiver into a power down state until the TIM field interval, at which time the receiver is put in a power-up state;
   the baseband processor examining the TIM field of the beacon frame, powering down, and subsequently powering up during an interval indicated by the TIM field to receive packets indicated as available by the TIM field.

2. The wireless receiver of claim 1 where said preamble detector determines start of a packet by detection of a start of frame delimiter (SFD).

3. The wireless receiver of claim 1 where said preamble processor extracts one or more parameters from a received beacon, said extracted parameters being at least one of:
   a beacon center frequency offset (b_CFO), receiver AGC value based on the beacon AGC value (b_AGC), a beacon receive signal strength indicator (b_RSSI), a beacon channel characterization (H_matrix), or a beacon symbol timing (b_sym_timing)
   said at least one extracted parameter is used by said receiver as an initial value to reduce the processing time of a subsequently received beacon frame.

4. The wireless receiver of claim 1 where said baseband processor powers down after detection or estimation of the end of preamble, the baseband processor thereafter powering up for the duration of at least one of:
   a beacon MAC source address field;
   a beacon frame length field;
   a TIM header field; or
   a TIM bitmap field.

5. The wireless receiver of claim 1 where said wakeup time includes a PLL settling time and an initialization time.

6. The wireless receiver of claim 1 where said preamble processor extracts a center frequency offset (b_CFO) and symbol timing (b_sym_timing) from a beacon preamble for use in demodulating subsequent fields of the preamble after power down of the receiver.

7. The wireless receiver of claim 1 where said receiver is powered on during a packet length field (b_LEN) and powered down after said TIM field, said wakeup processor enabling said receiver for transmission of packets after a received beacon frame has completed according to said b_LEN field.

8. The wireless receiver of claim 1 where said preamble detector is operative during a fragment of a preamble, the preamble processor comparing the fragment of preamble to a preamble template sequence, the preamble detector determining an end of preamble time and at least one of the interval for:
   a beacon MAC source address field;
   a beacon frame length field;
   a TIM header field; or
   a TIM bitmap field.

9. The wireless receiver of claim 8 where during at least one said interval for said beacon MAC source address field, said beacon frame length field, said TIME header field or said TIM bitmap field, said baseband processor is powered up and an associated field value is acquired, the baseband processor being powered down at other times.

10. A process for packet reception operative on a receiver, the process comprising:
    enabling power to a preamble detector during an interval of expected beacon frame arrival, the preamble detector operative on a segment of a preamble and indicating detection of a preamble, where the preamble detector performs a cross correlation of a fragment of a received preamble with a preamble template generated by a polynomial, the cross correlation indicating a start of frame delimiter, the start of frame delimiter indicating the interval of said TIM field;
    upon detection of a preamble, determining that the received frame is a beacon frame;
    upon determination that the received frame is a beacon frame, determining fields of interest and associated intervals, at least one field of interest being a TIM field;
    powering down the receiver at intervals other than the fields of interest;
    examination of said TIM field of said beacon to determine whether a packet is to be received from a remote station and powering down the receiver;
    if said TIM field indicates a packet is to be received, powering down the receiver until the beacon frame interval has passed, thereafter powering up the receiver and receiving packets associated with the TIM field.

11. The process of claim 10 where said preamble detection is the detection of a start of field delimiter.

12. The process of claim 10 where said receiver uses a previously saved parameter from a previous beacon as an initial value in a current beacon, said previously saved parameter being at least one of:
    a center frequency offset (b_CFO)
    an automatic gain control value (b_AGC)

a received signal strength indication (b_RSSI)
  a channel characterization (b_H_matrix)
  a symbol timing value (b_sym_timing).

13. The process of claim 10 where said receiver uses a previously saved parameter from a current beacon upon powerup after preamble detection in the same beacon, said previously saved parameter being at least one of:
  a packet length (b_LEN);
  a center frequency offset (b_CFO)
  a received signal strength indication (b_RSSI)
  a symbol timing value (b_sym_timing).

14. A wireless receiver for WLAN beacon frames comprising:
  a power controller for coupling a power source to a receiver comprising a preamble detector, a preamble processor, a baseband processor, and a wakeup processor;
  the power controller providing power to a preamble detector upon expected arrival of a beacon frame;
  the preamble detector examining an incoming packet for a preamble, the preamble detector operative during a fragment of a preamble, the preamble processor comparing the fragment of preamble to a preamble template sequence, the preamble detector determining an end of preamble time and at least one of the interval for:
    a beacon MAC source address field;
    a beacon frame length field;
    a TIM header field; or
    a TIM bitmap field;
  upon detection of a preamble, the receiver subsequently determining whether the packet is a beacon packet from an access point the station is associated with;
  upon determination that the packet is a beacon packet from an access point the station is associated with, the wakeup processor determining a wakeup time for the receiver during a TIM field of the beacon frame and putting the receiver into a power down state until the TIM field interval, at which time the receiver is put in a power-up state;
  the baseband processor examining the TIM field of the beacon frame, powering down, and subsequently powering up during an interval indicated by the TIM field to receive packets indicated as available by the TIM field.

15. The wireless receiver of claim 14 where during at least one said interval for said beacon MAC source address field, said beacon frame length field, said TIME header field or said TIM bitmap field, said baseband processor is powered up and an associated field value is acquired, the baseband processor being powered down at other times.

* * * * *